Figure 1:
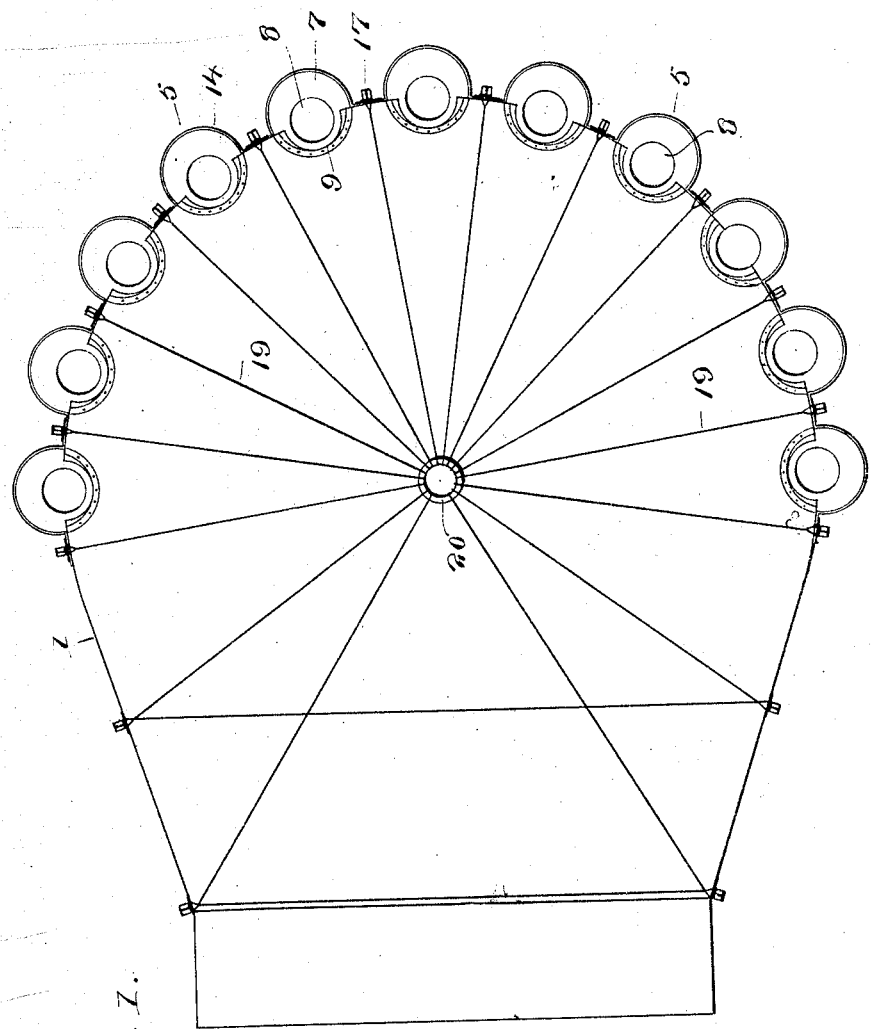

W. WESTBURY.
GLASS FURNACE.
APPLICATION FILED NOV. 12, 1915.

1,187,025.

Patented June 13, 1916.
3 SHEETS—SHEET 1.

Inventor
William Westbury

Witnesses
E. R. Ruppert.
C. C. Hines

By Victor J. Evans
Attorney

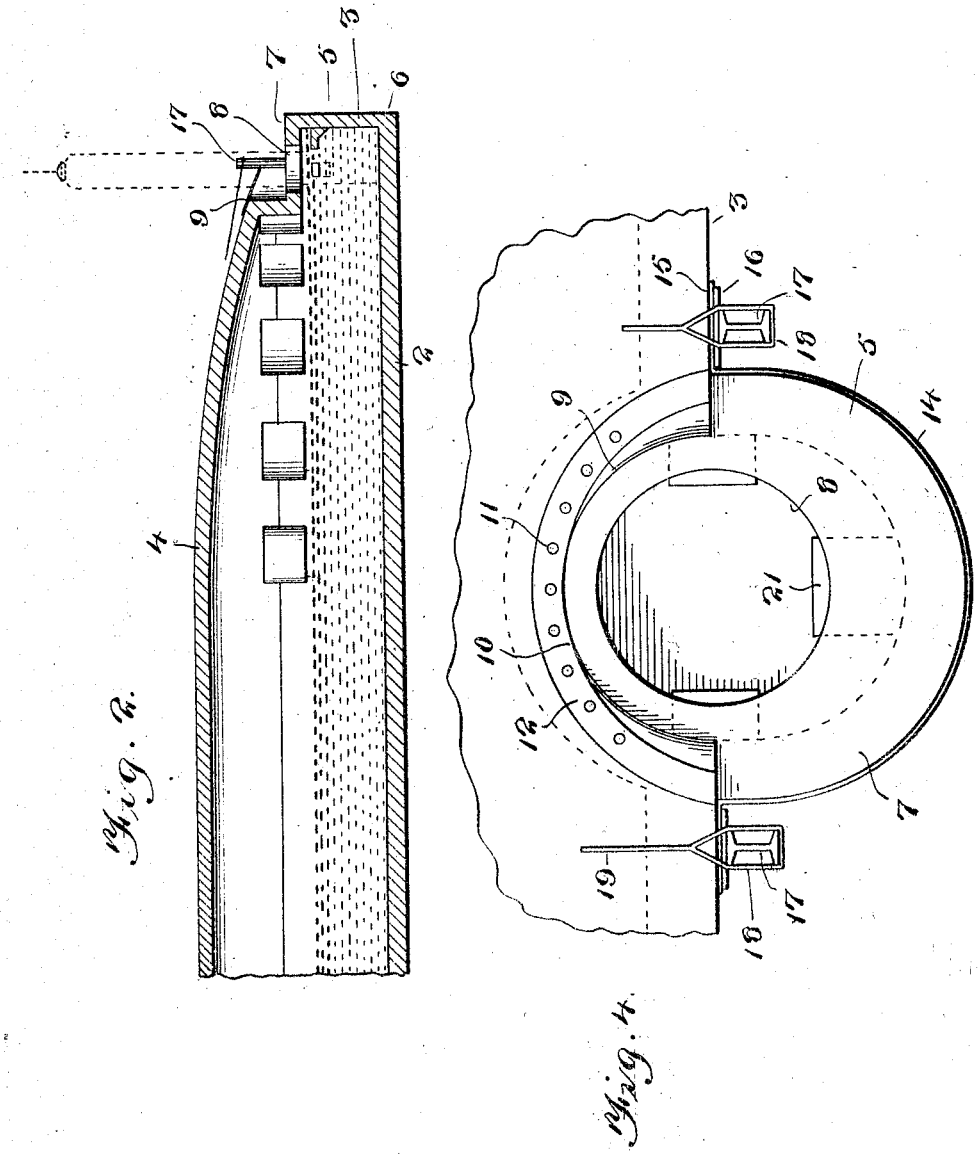

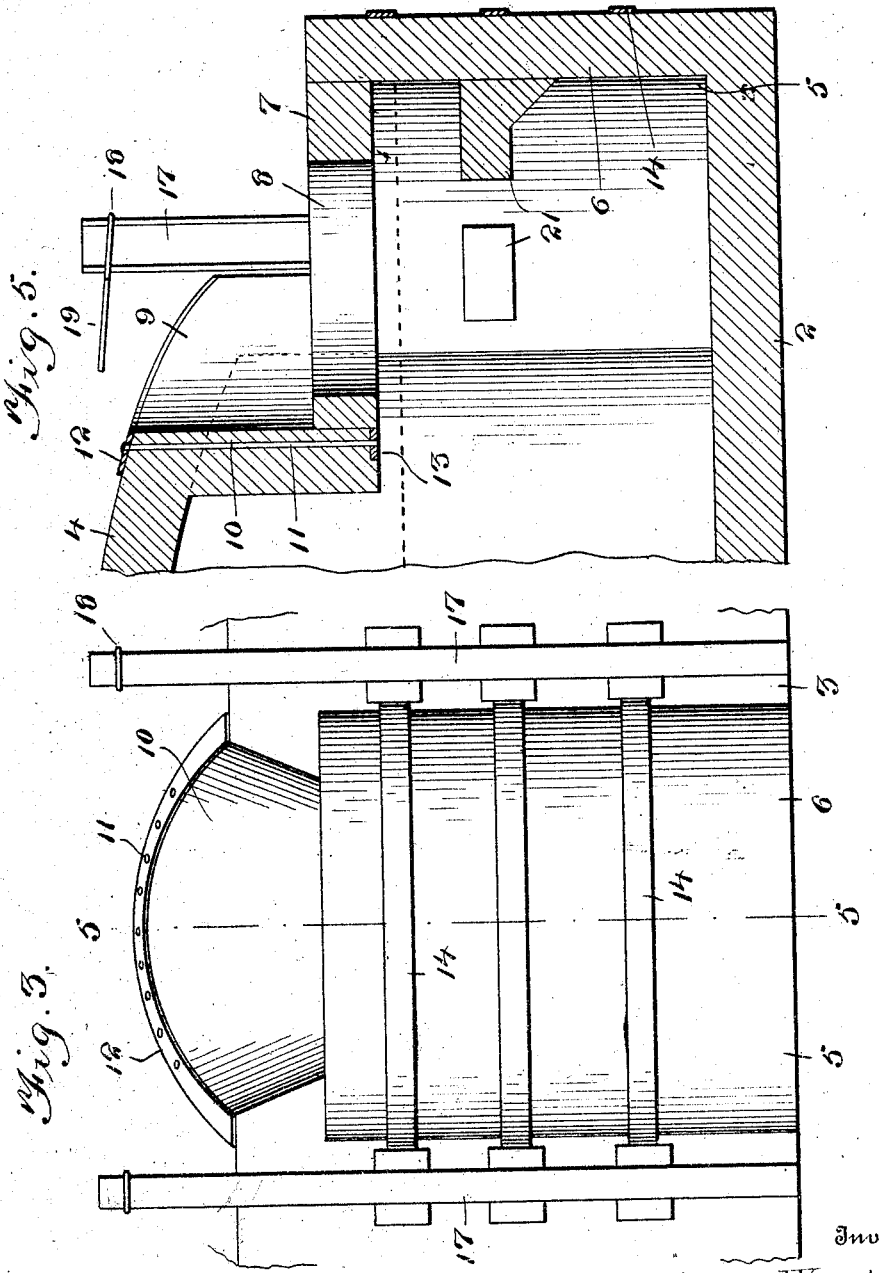

UNITED STATES PATENT OFFICE.

WILLIAM WESTBURY, OF OKMULGEE, OKLAHOMA, ASSIGNOR TO L. S. SKELTON, OF OKMULGEE, OKLAHOMA.

GLASS-FURNACE.

1,187,025.  Specification of Letters Patent.  Patented June 13, 1916.

Application filed November 12, 1915. Serial No. 61,138.

*To all whom it may concern:*

Be it known that I, WILLIAM WESTBURY, a citizen of the United States, residing at Okmulgee, in the county of Okmulgee and State of Oklahoma, have invented new and useful Improvements in Glass-Furnaces, of which the following is a specification.

This invention relates to improvements in glass furnaces, and particularly to tank furnaces of the kind employed in connection with glass drawing apparatus, the primary object of the invention being to provide a furnace having one or more openings for the passage of the drawing tool or tools and cylinder or cylinders in the operation of drawing the glass into cylindrical form, which opening or openings is or are arranged partially within and partially without the main tank or reservoir of the furnace, so that the glass drawn will be as close as possible to the source of heat and to the main body of heated glass within the tank, whereby purified glass of a high and uniform temperature may be supplied from the furnace for the draw to reduce to the minimum defects resulting from the use of glass chilled or cooled by undue exposure to the air and by contact with solid or unfused particles of glass commonly present at or near the drawing opening in structures where the surface of the glass is wholly exposed at the drawing point.

A further object of the invention is to provide a furnace having a series of dog houses or forehearths and drawing openings arranged partially within the furnace chamber and partially within the dog houses for the purpose above set forth, and wherein the walls of the furnace are supported and braced so as to avoid the use of interior pillars or supports or other obstructions to the free circulation or flow of the glass, so as to prolong the life of the furnace body and reduce to a minimum chilling of the glass, so that the glass will be maintained at a more nearly uniform temperature and degree of fluidity within the main tank, as a result of which, and by the close proximity of the glass within the dog houses to the main body of glass and the use of heaters, such as gas burners, at suitable points within the furnace chamber, the body of glass may be kept at a high temperature and in a highly purified state so that glass cylinders of greater uniformity of excellence and substantially free from the ordinary defects may be rapidly and economically produced.

With these and other objects in view, the invention consists of the features of construction, combination and arrangement of parts herein fully described and claimed, reference being had to the accompanying drawings in which:—

Figure 1 is a top plan view of a glass furnace constructed in accordance with my invention. Fig. 2 is a central, vertical, longitudinal section of the same. Fig. 3 is a front elevation of a portion of the furnace on an enlarged scale showing one of the dog houses and the associated drawing opening. Fig. 4 is a top plan view of a portion of the structure as shown in Fig. 3. Fig. 5 is a longitudinal section on an enlarged scale on the plane indicated by the line 5—5 of Fig. 3.

Referring to the drawings, 1 designates the side walls, 2 the bottom wall, 3 the front wall and 4 the top or crown wall of the furnace, the front wall 3 being shown as extending on a curved line and including in its structure a series of dog houses or forehearths 5. Each forehearth or dog house has its bottom wall formed by an extension of the main bottom wall 2 and is provided with a curved or segmental front wall 6 and a top wall 7 formed or provided with a drawing opening 8. The top wall 7 of each dog house is arranged to extend within a semi-circular recess 9 formed in the front wall of the furnace by offsetting a correspondingly shaped portion of said front wall inwardly in the form of a curved lintel or breast wall 10. The inward offsetting of this wall 10 allows the drawing opening 8 to be so arranged that one-half of said opening is arranged beyond the line of the front furnace wall while the remaining half of the opening is arranged wholly within the line of said front furnace wall. Thus the extent of projection of the dog house is diminished and the drawing opening brought closer to the main body of glass within the main tank and the extent of exposure of the glass to the surface of the outside air correspondingly diminished, with a result of keeping the glass in the dog house at a higher and more uniform temperature and to a greater extent free from lumps, stones, crusts or particles of congealed glass than is possible with furnaces of ordinary construction in which the whole or a greater portion of the surface of the glass within the dog house is exposed to the cooling effect of the outer atmosphere.

The walls 10 which, like the remaining walls of the furnace, may be made of fire brick, or other suitable material, are supported from the crown wall by bolts or rods 11 extending vertically through said walls and through metallic reinforcing and stay plates 12 and 13, by which the strength of the connection is increased. The walls of each dog house are braced by reinforcing bands 14 which are curved to conform thereto and have flattened end portions 15 bearing against the front wall of the furnace and held in engagement therewith by clamping plates 16. Arranged at the front of the furnace on opposite sides of each dog house and along the side walls of the furnace are upright supporting posts 17, preferably in the form of I-beams 17, and the beams at the sides of each dog house are arranged to engage the clamping plate 16 and hold the same and the ends of the braces 14 firmly and securely in position, thus providing for a firm and stable support of the front and side walls from the exterior of the furnace. Stirrups or loops 18 are connected with the upper ends of the beams 17 and serve as bridles to which are fastened the outer ends of upper bracing cables 19 which extend radially over the crown of the furnace and are united at a central point by an annular connector 20. The walls are thus mutually connected and braced so that the side and front as well as the crown walls will be held firmly sustained without the use of pillars or other supports upon the interior of the tank chamber, so that the interior of the chamber will be devoid of obstructions liable to impede the flow of the glass or to cause irregular distribution of heat or the transmission of excessive heat to portions of the walls and causing more or less rapid disintegration thereof. Hence the molten glass within the furnace chamber may be kept at a more uniform temperature, the loss of heat units by transmission through interior supports obviated, a more uniform and equal flow of the portions of the liquid mass of glass obtained with a better diffusion of heat, resulting in the production of a finer grade of glass, a diminution of solid or chilled particles and protection of the furnace walls from heat and a consequent prolongation of the life of the furnace.

The furnace is preferably but not necessarily designed for use in connection with floating, gathering and drawing pots of a type shown in my prior application No. 49,536, filed September 8, 1915, wherein the pots are adapted to be drawn back and forth between the furnace chamber and dog house, to be depressed within the dog house to supply a charge of glass for the draw through an opening in the bottom thereof, and after the draw to be pushed back into the furnace chamber so that the aftermath or refuse glass will be melted and drained off. Such pots may be employed or not in connection with a guide tube movably mounted in the drawing opening, as set forth in said application. The furnace may, however, be employed in the ordinary manner in connection with a drawing tool to draw or form the glass cylinder directly from the surface of the glass exposed beneath the drawing opening. In any event the glass used will be drawn from a body of glass which is arranged partially within the line of the furnace body, the whole of the glass being thus much closer to the source of heat than in ordinary furnaces. Thus the glass within the dog house is not so liable to become chilled, and is kept more uniformly heated by being partially arranged within the furnace chamber itself, and, since the body of the glass within the furnace chamber is kept at a high degree of heat and in a more highly purified condition, owing to the fact that no heat is lost or dissipated, the glass in the dog house is also maintained in a more highly purified state. This result is further obtained and promoted by reason of the fact that as there are no impediments to the flow of the glass or surface shifting of particles thereof, the movements of the pots over the body of glass tend to bring the hot glass forward into the dog houses and to shift any particles of crust or cold glass back into the furnace chamber, so that the portions of glass from which the cylinders are drawn are freer from imperfections and in a more highly fluid state than is possible with furnaces of ordinary construction, allowing practically perfect cylinders of uniform dimensions to be drawn with ease and facility. Blocks 21 are provided within the dog houses to support and limit the depression of glass pots of the character described.

It will be observed that the front and side walls of the furnace are devoid of all projections except the blocks 21, which are so arranged that they do not interfere with the free movement of the glass, and that the offsets or breast walls are arranged wholly above the level of the glass so as to avoid projections within the body of the latter, and furthermore, that the main body of the furnace opens directly into the dog houses without intervening walls or obstructions of any kind liable to retain and hold particles of chilled glass or to absorb and dissipate the heat. All the heat units are therefore transmitted to the glass and employed to keep the glass in a suitably melted and refined condition. In practice any suitable number of gas burners (not shown) may be employed at desired points to augment the heat adjacent to the dog houses and to melt the glass to effect the separation of the formed cylinders, if desired, from the body of glass below.

I claim:—

1. A glass furnace including a dog house and having a drawing opening arranged partly within the dog house and partly within the furnace body.

2. A glass furnace having a furnace chamber provided with a dog house extending outwardly beyond the line thereof, the front wall of the furnace chamber being offset inwardly so as to partially receive the top of the dog house, the said top of the dog house being provided with a drawing opening extending partially beyond and partially within the line of the furnace wall.

3. A glass furnace having a dog house projecting partially upon the exterior and partially upon the interior of the line of the front wall thereof, the said front wall of the furnace body being provided with an inwardly extending concavity above the inner portion of the dog house, and the top wall of the dog house being formed with a drawing opening projecting partially beyond the line of said front wall and partially within the line of said front wall and in register with said cavity.

4. A glass furnace having a dog house projecting partially exteriorly and partially interiorly of the line of the front wall thereof, and terminating below the crown of the furnace body, the top wall of said dog house being provided with a drawing opening extending equally on opposite sides of the line of the front wall, the said front wall being provided with a concaved breast portion above the inner portion of the top wall of the dog house and in registry with the inner portion of said opening.

5. A glass furnace having a dog house extending partially exteriorly and partially interiorly of the line of the front wall thereof and terminating below the crown of the furnace body, the top wall of said dog house being provided with a drawing opening extending equally on opposite sides of the line of the front wall, the said front wall of the furnace body having a breast portion curved to form a concaved recess communicating with the inner portion of the drawing opening, and means for reinforcing and connecting said breast portion with the crown wall of the furnace body.

6. A glass furnace comprising a body forming a furnace chamber embodying walls supported wholly from the exterior of said body and providing an unobstructed glass chamber therein, said furnace having a dog house projecting partially exteriorly and partially interiorly of the line of the front wall thereof and below the top of the crown wall thereof, the top wall of said dog house being formed with a drawing opening extending equally on opposite sides of the line of the front wall, and the latter being provided with a breast concavity forming a recess above the inner portion of said drawing opening.

7. A glass furnace comprising a body having a curved front wall provided with a series of dog houses extending partially upon the exterior and partially upon the interior of the furnace body, said dog houses having openings in the top thereof partially within and partially without the line of the front wall of the furnace body, said front wall of the furnace body being formed with concaved breast portions providing recesses above the inner portions of the openings, and means for bracing the walls of the furnace wholly from the exterior thereof leaving the interior of the furnace chamber devoid of obstructing supports.

8. A glass furnace comprising a furnace body having a curved front wall provided with dog houses projecting partially within and partially without the line thereof and terminating below the crown wall of the furnace body, said dog houses being provided in their top walls with drawing openings arranged partially within and partially without the line of said front wall, and the front wall being provided with concaved breast portions forming recesses above the inner portions of the drawing openings, means for reinforcing the breast portions from the crown wall of the furnace, supporting posts along the side and front walls of the furnace, and arranged so as to come along the front wall on opposite sides of the dog houses, bracing means for the walls of the dog houses connected with said posts, and bracing connections uniting the posts above the crown wall of the furnace.

9. A glass furnace comprising a furnace body having a front wall and an offset drawing chamber having an outer vertical wall lying externally of the wall of the furnace, an inner vertical wall lying internally of the front wall of the furnace, and a top wall provided with a drawing opening, said drawing opening extending to substantially equal degrees inwardly and outwardly beyond the line of the front furnace wall.

In testimony whereof I affix my signature in presence of two witnesses.

WILLIAM WESTBURY.

Witnesses:
H. O. HEMMICK,
P. E. PARKER.